Figure 1:
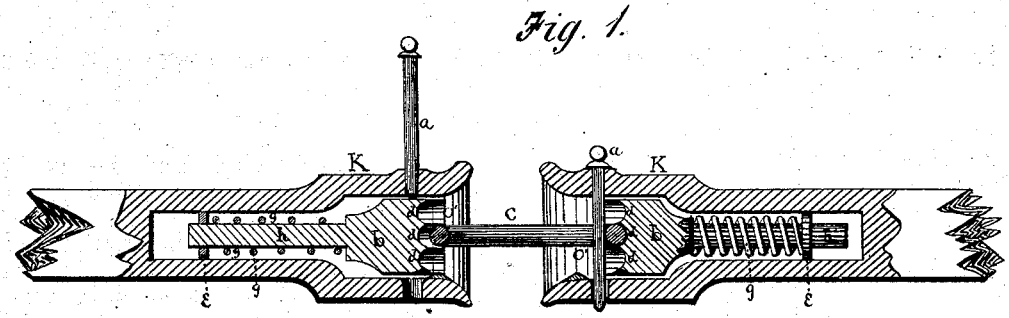

W. PETTENGILL.
Car-Coupling.

No. 159,444.  Patented Feb. 2, 1875.

WITNESSES.
R. K. Evans
Will H. Morow

INVENTOR
Manasseh Pettengill
by his attys.
Evans, Comstock & Co

UNITED STATES PATENT OFFICE.

MANASSEH PETTENGILL, OF MINNEAPOLIS, MINNESOTA, ASSIGNOR OF ONE-HALF HIS RIGHT TO W. A. MERRIAM, OF SAME PLACE.

IMPROVEMENT IN CAR-COUPLINGS.

Specification forming part of Letters Patent No. 159,444, dated February 2, 1875; application filed August 12, 1874.

*To all whom it may concern:*

Be it known that I, MANASSEH PETTENGILL, of the city of Minneapolis, county of Hennepin and State of Minnesota, have invented a new and useful Improvement in Compound and Automatic Car-Couplings, of which the following is a full, clear, and exact description, reference being had to the drawing hereto annexed, being made part of this specification.

The invention is an improvement in automatic car-couplings; and consists in providing the sliding head of the buffer with a series of parallel horizontal semicircular grooves or cavities to receive the curved end of the link, as and for the purpose hereinafter specified.

Figure 2:
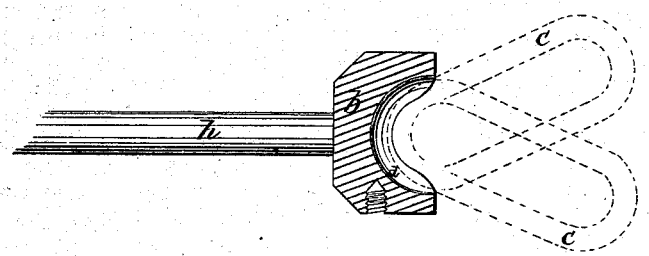

In the drawing, Figure 1 is a sectional elevation of my improved coupling. Fig. 2 is a horizontal section of the sliding head.

The draw-head or buffer K is constructed in the usual or a well-known manner, and is provided interiorly with the cross-bar e, through which slides the stem or shank h of head b. The spiral spring g encircles the stem or shank h, between the head b and cross-bar e, and a suitable stop is provided to prevent the head moving too far when pushed forward by the spring. The head b, which is enlarged to fill the mouth or front chamber of the draw-head, has a series of transverse grooves, d, formed in its face or front side, said face having a semicircular concavity, as shown in Fig. 2. Each of said grooves d is therefore formed upon the arc of a circle, and the division between each two of them is a thin beveled rib of like semicircular form.

It results from this construction that the link may be held horizontally (by pressure between the head b and pin a) in alignment with the draw-head, as shown in Fig. 1, or at an angle thereto, as shown by dotted lines, Fig. 2, whereby it is adapted for coupling cars upon both straight and curved tracks. The link may be also quickly adjusted from one groove to another by a single torsional movement without removing the pin a, since the spring g does not require to be powerful when the grooves d are made in this form.

It will be understood that when two cars are to be coupled the pin a is supported on the head b of one of the draw-heads, as shown in Fig. 1, and the link which projects from the opposite draw-head then pushes back the sliding head and allows said pin to drop through it, (the link.)

I do not claim, broadly, a sliding head provided with grooves to receive a link; but I do claim—

The head b, having the vertical concavity in its face, and the series of horizontal semicircular grooves d, with beveled intermediate ribs, as shown and described.

MANASSEH PETTENGILL.

Witnesses:
F. M. COMSTOCK,
O. M. PARSONS.